United States Patent
Park et al.

(10) Patent No.: US 9,434,249 B2
(45) Date of Patent: Sep. 6, 2016

(54) FUEL CAP INTEGRATED APERTURE TYPE FUEL DOOR STRUCTURE

(71) Applicant: Hyundai Motor Company, Seoul (KR)

(72) Inventors: Hoo Sang Park, Hwaseong-si (KR); Soo Han Cho, Cheonan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/553,760

(22) Filed: Nov. 25, 2014

(65) Prior Publication Data
US 2016/0068064 A1 Mar. 10, 2016

(30) Foreign Application Priority Data
Sep. 5, 2014 (KR) .................. 10-2014-0118627

(51) Int. Cl.
*B60K 15/05* (2006.01)

(52) U.S. Cl.
CPC ....... *B60K 15/05* (2013.01); *B60K 2015/0507* (2013.01); *B60K 2015/0515* (2013.01)

(58) Field of Classification Search
CPC ... B60J 1/2019; B60J 1/2086; B60N 2/0248; B60N 2/10; B60N 2/24; B60N 2/36; B62D 33/0617; B62D 33/06; B62D 33/0604; B62D 33/0633; B62D 33/0625; B62D 25/06; B62D 21/186
USPC ......... 296/190.03, 210, 102, 35.2, 213, 146, 296/105; 292/336.3, 199, 201, 216; 16/412
See application file for complete search history.

(56) References Cited

U.S. PATENT DOCUMENTS

| | | | |
|---|---|---|---|
| 6,375,155 B1 * | 4/2002 | Janssens | F16L 55/10 251/212 |
| 7,007,726 B1 | 3/2006 | Martin et al. | |
| 7,819,728 B2 * | 10/2010 | Beckley | B60H 1/3407 220/822 |
| 8,430,140 B2 | 4/2013 | Ognjanovski et al. | |
| 8,910,920 B1 * | 12/2014 | Daniels | F16K 3/03 123/188.1 |
| 2008/0060636 A1 * | 3/2008 | Tuchelt | F24J 2/407 126/701 |
| 2008/0135552 A1 | 6/2008 | Baudoux et al. | |
| 2009/0189410 A1 * | 7/2009 | Gurtatowski | B60K 15/05 296/97.22 |
| 2011/0132905 A1 | 6/2011 | Ognjanovski et al. | |

FOREIGN PATENT DOCUMENTS

| | | |
|---|---|---|
| JP | 2007-261492 A | 10/2007 |
| JP | 2008-505301 A | 2/2008 |
| KR | 10-2004-0008701 A | 1/2004 |
| KR | 10-0462670 | 12/2004 |
| KR | 10-2007-0104926 | 10/2007 |
| KR | 10-2008-0015069 | 2/2008 |

* cited by examiner

*Primary Examiner* — Glenn Dayoan
*Assistant Examiner* — Sunsurraye Westbrook
(74) *Attorney, Agent, or Firm* — Morgan, Lewis & Bockius LLP

(57) ABSTRACT

A fuel cap integrated aperture type fuel door structure may include a door frame provided with a fuel hole through which a fuel is introduced, a fixed ring concentrically formed with the fuel hole and fixed to the door frame, and moving panels rotatably fixed to the fixed ring to adjust an opened degree of the fuel hole.

11 Claims, 10 Drawing Sheets

FUEL CAP INTEGRATED APERTURE TYPE FUEL DOOR STRUCTURE

CROSS-REFERENCE TO RELATED APPLICATION

The present application claims priority to Korean Patent Application No. 10-2014-0118627, filed Sep. 5, 2014, the entire contents of which is incorporated herein for all purposes by this reference.

BACKGROUND OF THE INVENTION

1. Field of the Invention

The present invention relates to a fuel cap integrated aperture type fuel door structure, and more particularly, to a fuel cap integrated aperture type fuel door structure capable of opening and closing a fuel inlet using a plurality of moving panels formed in a lens and having an aperture shape.

2. Description of Related Art

Figure 1A:
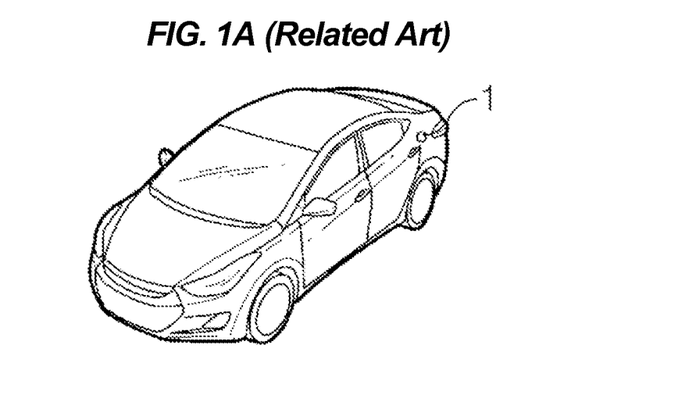
FIG. 1A, FIG. 1B, and FIG. 1C are a perspective view and another perspective view of a fuel door included in a fuel inlet according to the related art.
Figure 1B:
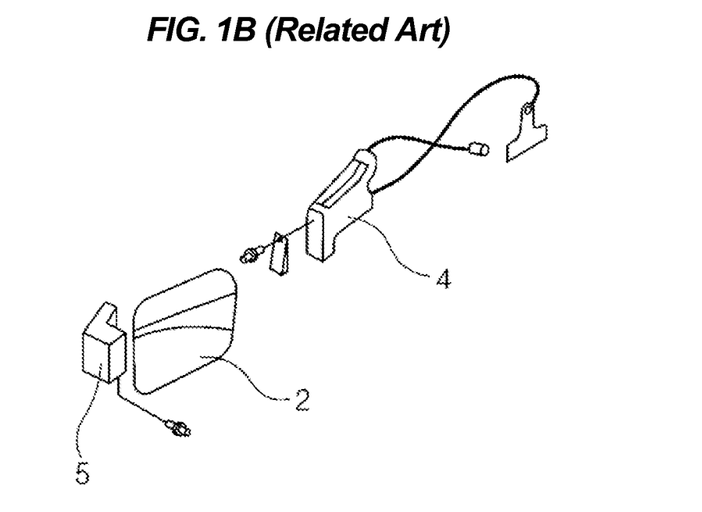
Figure 1C:
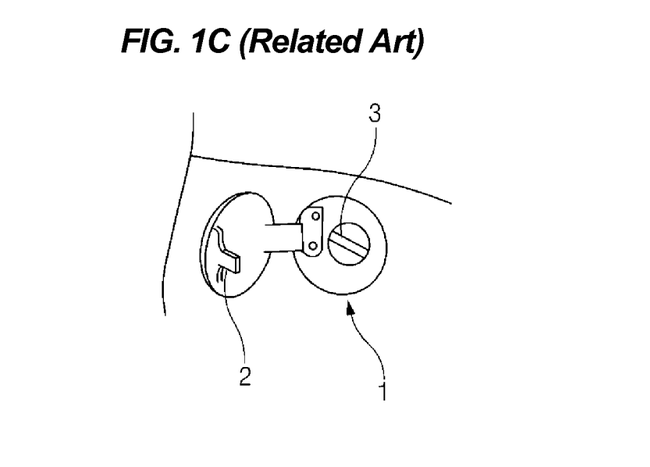

Generally, a fuel inlet of a vehicle is provided with a fuel door 2 opening and closing a space in which the fuel inlet 1 is embedded and a fuel cap 3 closing the fuel inlet 1 in order to prevent outflow of a fuel, as shown in FIG. 1A, FIG. 1B, and FIG. 1C.

The fuel door 2 is provided with a locking device 4 operated by a cable or an actuator signal and a hinge device 5 allowing the fuel door 2 to open the space depending on the operation of the locking device 4.

However, since a space in which the locking device and the hinge device are mounted has been required in a fuel inlet according to the related art, there was a limitation in a position at which the fuel inlet is formed.

In addition, in the fuel inlet according to the related art, at the time of supplying oil, the fuel cap should be rotated to be separated from the fuel inlet, which is troublesome.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a fuel cap integrated aperture type fuel door structure that does not have a limitation in a position at which a fuel inlet is formed.

According to various aspects of the present invention, a fuel cap integrated aperture type fuel door structure may include a door frame provided with a fuel hole through which a fuel is introduced, a fixed ring concentrically formed with the fuel hole and fixed to the door frame, and moving panels rotatably fixed to the fixed ring to adjust an opened degree of the fuel hole.

End portions of a plurality of the moving panels may pass through a center of the fixed ring.

The plurality of the moving panels may meet each other at the center of the fixed ring to close the fuel hole.

The fuel hole may be connected to a connection pipe part receiving the fuel from an outside to a fuel tank provided in a vehicle.

The fixed ring may be fixed to the door frame so as to be concentrically formed with the fuel hole.

The fuel cap integrated aperture type fuel door structure may further include a rotator ring concentrically formed with the fixed ring and provided in the door frame so as to rotate based on a center of the fuel hole, and a plurality of links each having one side hinge-connected to the rotator ring.

Each of the moving panels may have one side hinge-connected to the fixed ring and another side hinge-connected to any one of the plurality of links.

The moving panels may rotate based on connection parts hinge-connected to the fixed ring, and a plurality of the moving panels may be combined with or separated from each other to close or open the fuel hole.

The rotator ring may be provided with a screw thread engaged with an actuator mounted on an outer circumference of the door frame.

The door frame may include a fuel door cover coupled thereto so that the fixed ring, the rotator ring, and the links are not exposed to an outside.

The links may be arc shaped bars.

According to various aspects of the present invention, a fuel cap integrated aperture type fuel door structure may include a door frame provided with a fuel hole connected to a connection pipe part receiving a fuel introduced from an outside to a vehicle to a fuel tank, a fixed ring fixed to the door frame and concentrically formed with the fuel hole, a rotator ring concentrically formed with the fixed ring and provided in the door frame so as to rotate based on a center of the fuel hole, links hinge-connected to the rotator ring, and moving panels hinge-connected to the links and adjusting an opened degree of the fuel hole.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIG. 2, FIG. 3A, FIG. 3B, FIG. 4, FIG. 5, FIG. 6, FIG. 7A, FIG. 7B, FIG. 7C, FIG. 7D, FIG. 7E, and FIG. 7F, a fuel cap integrated aperture type fuel door structure according to various embodiments of the present invention may include a door frame 100 provided with a fuel hole 110 through which a fuel is introduced, a fixed ring 200 forming concentricity with the fuel hole 110 and fixed to the door frame 100, and moving panels 500 rotatably fixed to the fixed ring 200 to adjust an opened degree of the fuel hole 110.

The number of moving panels 500 is plural, and end portions of the plurality of moving panels 500 pass through the center of the fixed ring 200. The plurality of moving panels 500 meet each other at the center of the fixed ring 200 to close the fuel hole 110. The fuel hole 110 is connected to a fuel injection pipe inducing a fuel from the outside to a fuel tank provided in a vehicle.

The fuel cap integrated aperture type fuel door structure according to various embodiments of the present invention configured as described above will be described in more detail below. The fuel cap integrated aperture type fuel door structure according to various embodiments of the present invention includes the door frame 100 in which a connection pipe part 120 connected to the fuel injection pipe extended to the fuel tank provided in a vehicle body is formed in the fuel hole 110, the fixed ring 200 fixed to the door frame 100 so as to form the concentricity with the fuel hole 110, a rotator ring 300 forming concentricity with the fixed ring 200 and provided in the door frame 100 so as to receive rotational force from an actuator 130 provided in the door frame 100 to rotate based on the center of the fuel hole 110, a plurality of links 400 each having one side hinge-connected to the rotator ring 300, and the plurality of moving panels 500 each having one side hinge-connected to the fixed ring 200 and the other sides hinge-connected to any one of the plurality of links 400.

Figure 2:
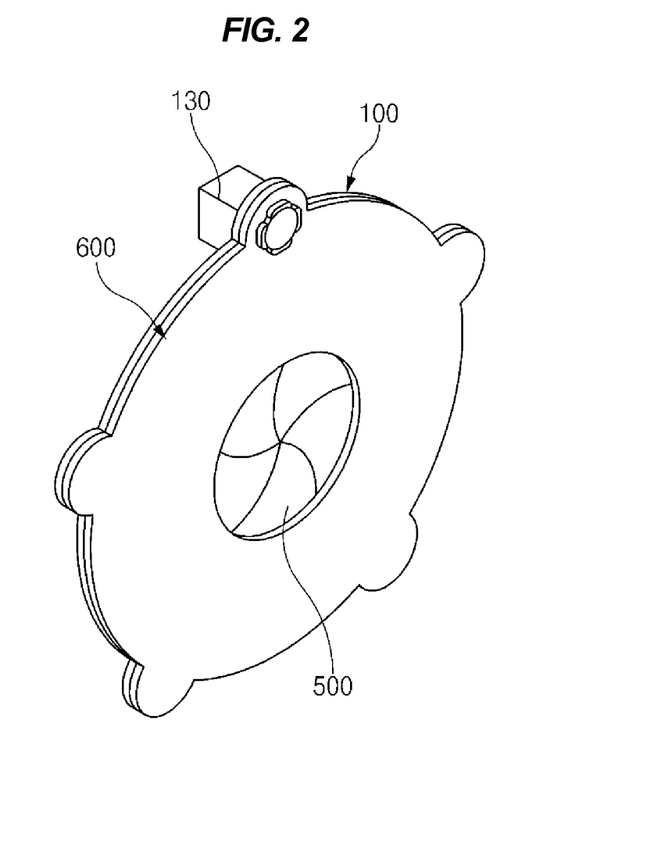
FIG. 2 is a perspective view of an exemplary fuel cap integrated aperture type fuel door structure according to an exemplary embodiment of the present invention.
Figure 3A:
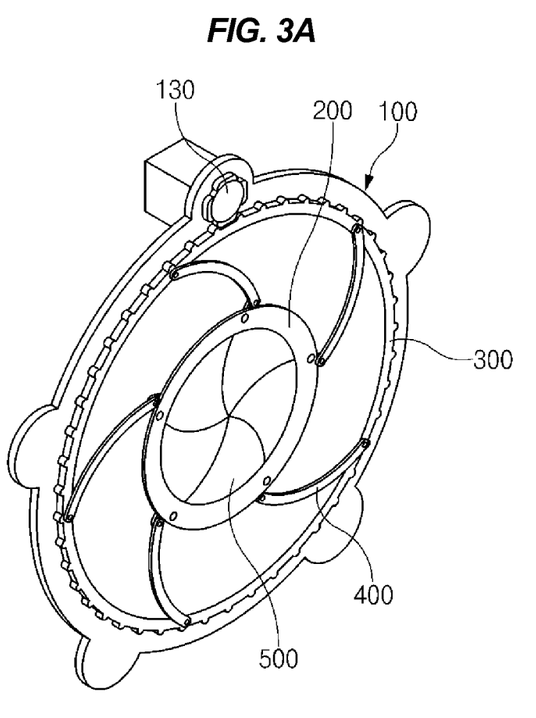
FIG. 3A and FIG. 3B are perspective views showing main parts of the exemplary fuel cap integrated aperture type fuel door structure of FIG. 2.
Figure 3B:
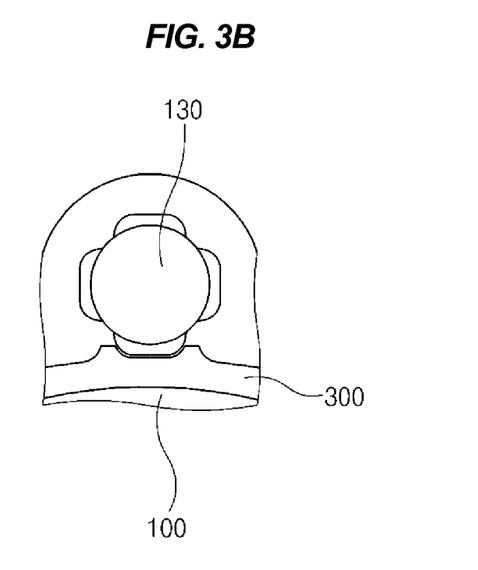

The door frame 100 includes a fuel door cover 600 coupled thereto so that the fixed ring 200, the rotator ring 300, and the links 400 are not exposed to the outside (See FIG. 2). In various embodiments of the present invention, the door frame 100 is formed of a doughnut shaped plate in which it has a diameter larger than that of the rotator ring 300. The door frame 100 has five semi-circular protrusions formed on an outer circumference thereof, and the actuator 130 is mounted perpendicularly to any one of the five protrusions. Screws are screwed to the other protrusions on which the actuator 130 is not mounted and are fixed to the vehicle body, such that the door frame 100 is fixed to the vehicle body.

The fixed ring 200 is attached to the door frame 100 so as to be horizontal to the door frame 100 and have a predetermined height.

Figure 4:
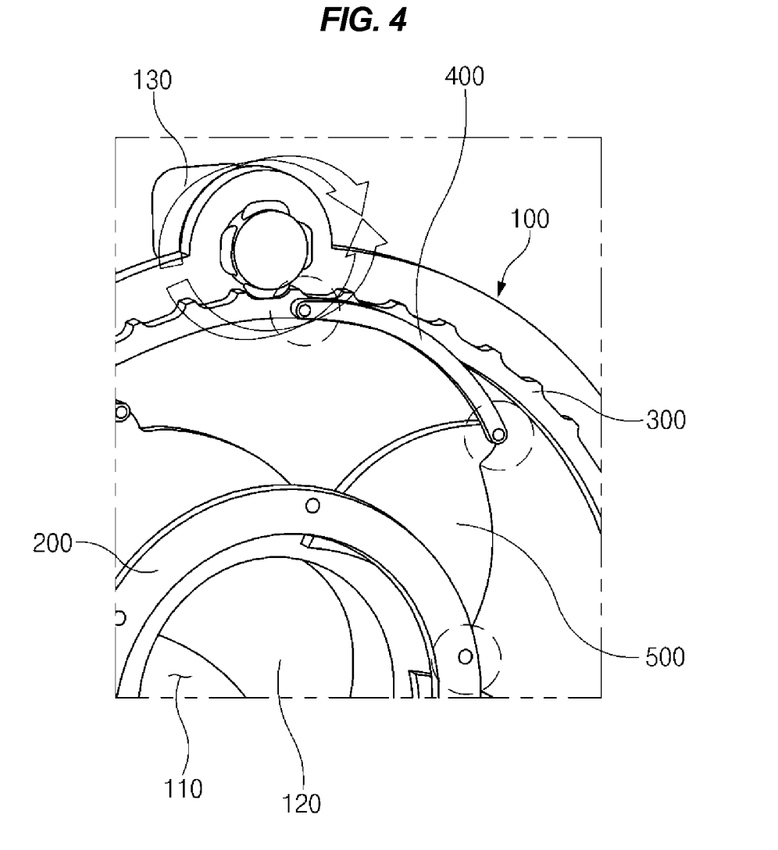
FIG. 4 is another perspective view showing main parts of the exemplary fuel cap integrated aperture type fuel door structure of FIG. 2.
Figure 5:
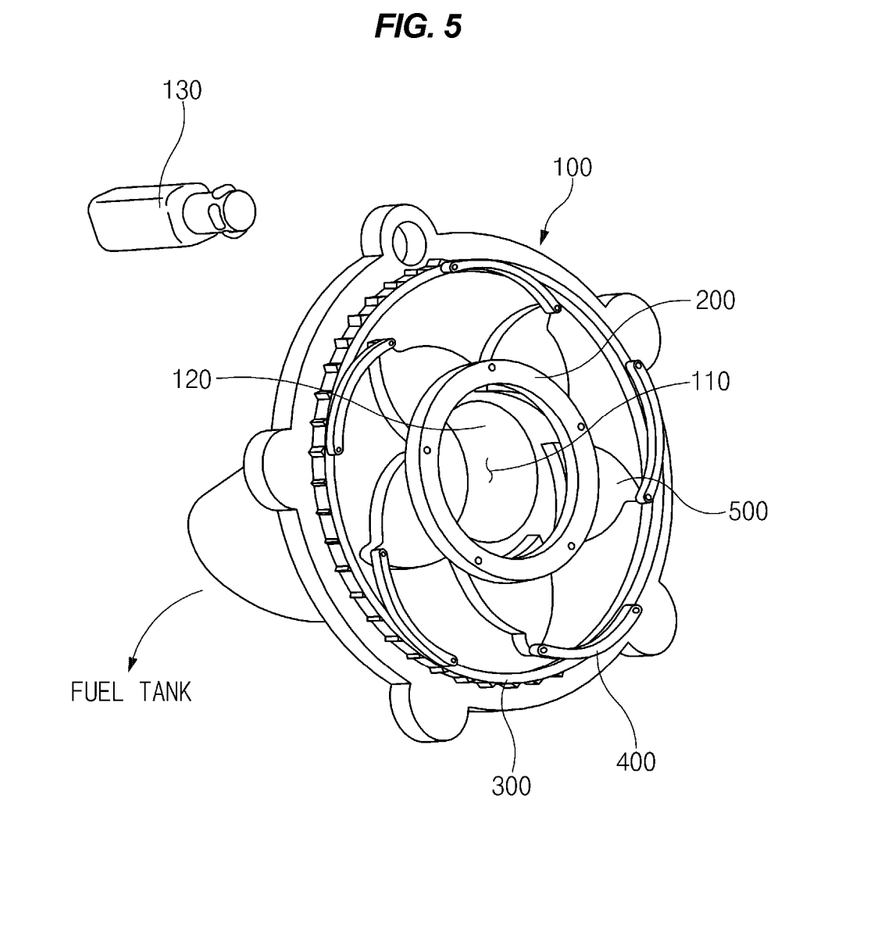
FIG. 5 is another perspective view of the exemplary fuel cap integrated aperture type fuel door structure of FIG. 2.

The rotator ring 300 is provided with a screw thread engaged with the actuator 130 mounted on the outer circumference of the door frame 100 (See FIG. 4). In various embodiments of the present invention, the links 400 may be formed of an arc shaped bar, and the number of links 400 is five. The moving panels 500 may be formed in a modified triangular shape in which all of three sides thereof have a curvature, and the number of moving panels 500 is five.

The respective moving panels 500 rotate based on connection parts hinge-connected to the fixed ring 200, and the plurality of moving panels 500 are combined with each other to close the fuel hole 110. Here, the plurality of moving panels 500 combined with each other form a circle having a diameter larger than that of the fuel hole 110.

In addition, the respective moving panels 500 rotate based on the connection parts hinge-connected to the fixed ring 200, and the plurality of moving panels 500 are separated from each other to open the fuel hole 110.

Figure 6:
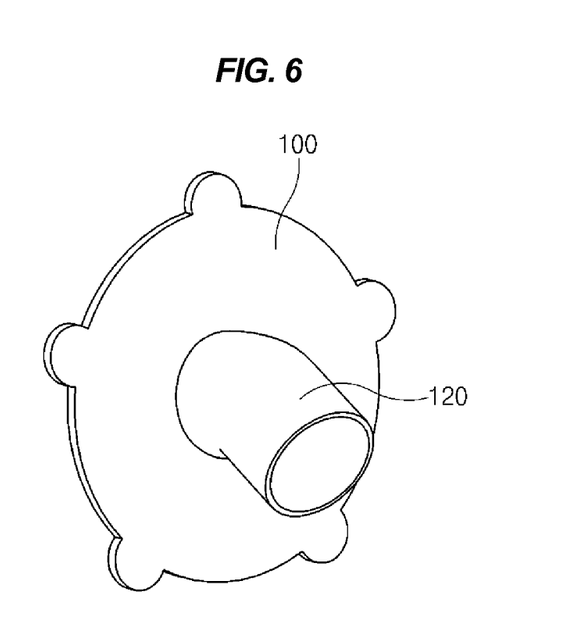
FIG. 6 is still another perspective view of the exemplary fuel cap integrated aperture type fuel door structure of FIG. 2.
Figure 7A:
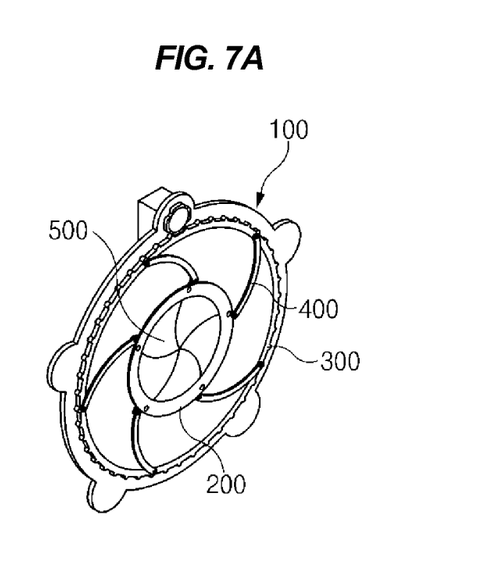
FIG. 7A, FIG. 7B, FIG. 7C, FIG. 7D, FIG. 7E, and FIG. 7F are operation state views of the exemplary fuel cap integrated aperture type fuel door structure of FIG. 2.
Figure 7B:
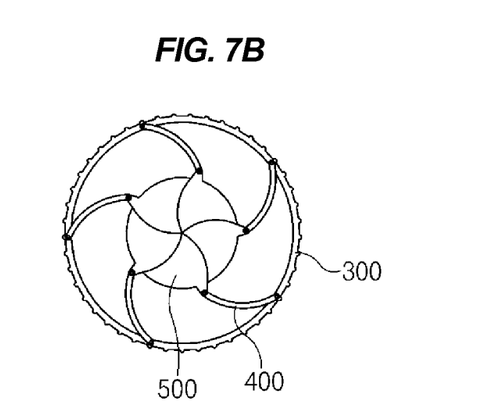
Figure 7C:
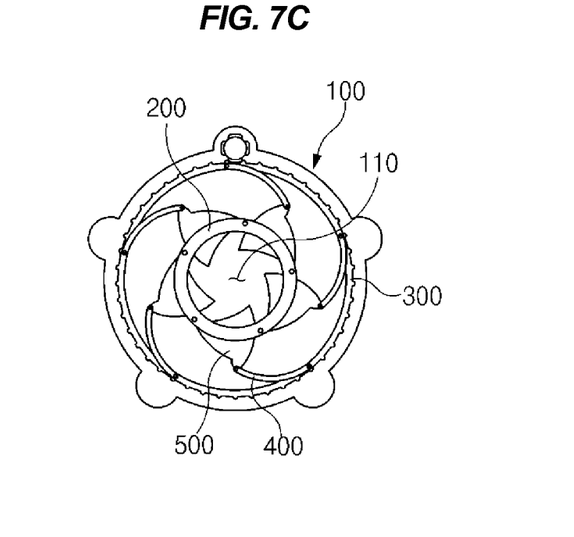
Figure 7D:
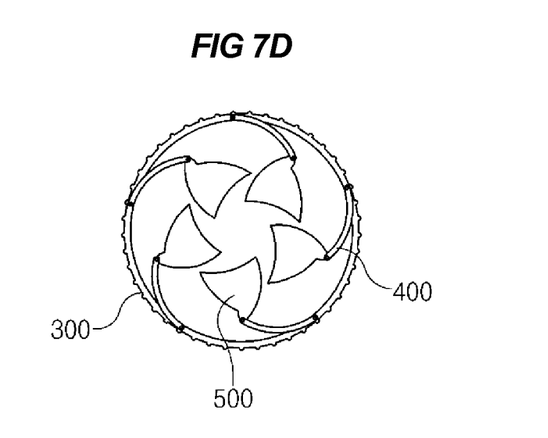
Figure 7E:
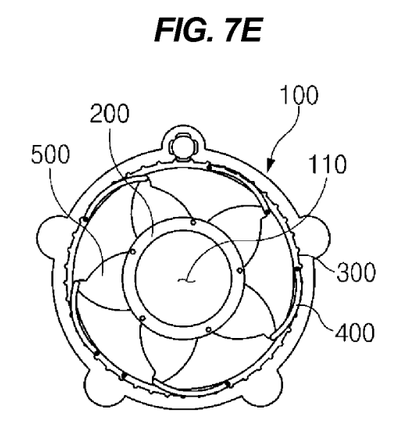
Figure 7F:
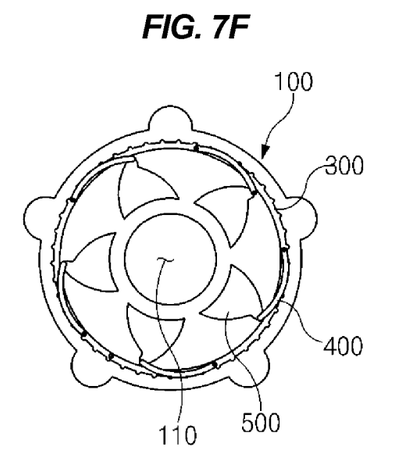

A detailed description thereof will be provided below. As shown in FIG. 6, initially, sides of the moving panels 500 having a curvature are engaged with each other to form a circular shape having a diameter larger than that of the fuel hole 110 and maintain a state in which they close the fuel hole 110.

As the actuator 130 is operated, the rotator ring 300 rotates. As the rotating ring 300 rotates, the links 400 each having one side hinge-connected to the rotator ring 300 move, and the moving panels 500 each having one side hinge-connected to the links 400 rotate toward the rotator ring 300 based on the connection parts hinge-connected to the fixed ring 200.

Therefore, the sides of the moving panels 500 having the curvature are separated from each other to open the fuel hole 110.

In the fuel cap integrated aperture type fuel door structure according to various embodiments of the present invention configured as described above, the moving panels 500 open and close the fuel hole 110, that is, the fuel injection pipe. Therefore, since a fuel cap for closing a fuel injection pipe and a locking device and a high device for operating a fuel door, which have been used in the related art, are removed, a total volume of the fuel inlet is decreased. Since the total volume of the fuel inlet is decreased, a limitation in a space in which the fuel inlet is to be formed is decreased, such that a limitation in a position at which the fuel inlet is formed is decreased.

As set forth above, with the fuel cap integrated aperture type fuel door structure according to various embodiments of the present invention, since devices having a large volume, such as the locking device, the hinge device, and the like, that have been provided in the fuel door according to the related art are removed, the limitation in the position at which the fuel inlet is formed may be decreased.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel cap integrated aperture type fuel door structure comprising:
    a door frame provided with a fuel hole through which a fuel is introduced;
    a fixed ring concentrically formed with the fuel hole and fixed to the door frame;
    moving panels rotatably fixed to the fixed ring to adjust an opened degree of the fuel hole;
    a rotator ring concentrically formed with the fixed ring and provided in the door frame so as to rotate based on a center of the fuel hole; and
    a plurality of links each having a first end hinge-connected to the rotator ring and a second end hinge-connected to a corresponding moving panel, wherein the first end and the second are spaced each other.

2. The fuel cap integrated aperture type fuel door structure according to claim 1, wherein end portions of a plurality of the moving panels pass through a center of the fixed ring.

3. The fuel cap integrated aperture type fuel door structure according to claim 2, wherein the plurality of the moving panels meet each other at the center of the fixed ring to close the fuel hole.

4. The fuel cap integrated aperture type fuel door structure according to claim 1, wherein the fuel hole is connected to a connection pipe part receiving the fuel from an outside to a fuel tank provided in a vehicle.

5. The fuel cap integrated aperture type fuel door structure according to claim 1, wherein the fixed ring is fixed to the door frame so as to be concentrically formed with the fuel hole.

6. The fuel cap integrated aperture type fuel door structure according to claim 1, wherein each of the moving panels have a first end hinge-connected to the fixed ring and a second end hinge-connected to one of the plurality of links.

7. The fuel cap integrated aperture type fuel door structure according to claim 6, wherein the moving panels rotate based on connection parts hinge-connected to the fixed ring, and
    a plurality of the moving panels are combined with or separated from each other to close or open the fuel hole.

8. The fuel cap integrated aperture type fuel door structure according to claim 1, wherein the rotator ring is provided with a screw thread engaged with an actuator mounted on an outer circumference of the door frame.

9. The fuel cap integrated aperture type fuel door structure according to claim 1, wherein the door frame includes a fuel door cover coupled thereto so that the fixed ring, the rotator ring, and the links are not exposed to an outside.

10. The fuel cap integrated aperture type fuel door structure according to claim 1, wherein the links are arc shaped bars.

11. A fuel cap integrated aperture type fuel door structure comprising:
    a door frame provided with a fuel hole connected to a connection pipe part receiving a fuel introduced from an outside to a vehicle to a fuel tank;
    a fixed ring fixed to the door frame and concentrically formed with the fuel hole;
    a rotator ring concentrically formed with the fixed ring and provided in the door frame so as to rotate based on a center of the fuel hole;
    links hinge-connected to the rotator ring; and
    moving panels each of which is hinge-connected, at a first end thereof, to a corresponding link and at a second end thereof, to the fixed ring wherein the first end and the second end are spaced from each other and the moving panels are configured to adjust an opened degree of the fuel hole.

* * * * *